United States Patent [19]

Skrycki

[11] Patent Number: 4,505,486
[45] Date of Patent: Mar. 19, 1985

[54] MECHANICAL FASTENER FOR INTAKE MANIFOLD GASKET

[75] Inventor: Andrew R. Skrycki, Riverview, Mich.

[73] Assignee: Ex-Cell-O Corporation, Troy, Mich.

[21] Appl. No.: 643,993

[22] Filed: Aug. 24, 1984

[51] Int. Cl.³ .................... F16J 15/12; F02B 77/00
[52] U.S. Cl. .................... 277/235 B; 277/32; 277/184; 123/198 E
[58] Field of Search .......... 277/235 R, 235 A, 235 B, 277/180, 12, 32, 182–184; 123/198 R, 198 E

[56] References Cited

U.S. PATENT DOCUMENTS 3,396,712  8/1968  Sakraida et al. ............... 123/198 E
4,126,318  11/1978  Belter ........................ 277/235 B X

FOREIGN PATENT DOCUMENTS 884584  7/1953  Fed. Rep. of Germany ... 123/198 E
893598  10/1953  Fed. Rep. of Germany ... 277/235 B
270448  1/1930  Italy ........................... 277/235 B Primary Examiner—Robert S. Ward
Attorney, Agent, or Firm—John P. Moran

[57] ABSTRACT

Mechanical fastener means for blocking off an opening in an intake manifold gasket when the latter is used with a fuel injected engine. The fastener means includes two mating metal members whose outer edges are oppositely bowed to extend past and confine the oppositely disposed edge portions of the gasket opening therebetween, with one of the members having a central opening formed therein for receiving a "button" extension in the shape of a substantially cylindrical cup formed on the other member and, once extended through the central opening, such button extension being mechanically impacted to be caused to assume a dished shape and a flanged connection with the edge portion of the central opening in the one member.

4 Claims, 2 Drawing Figures

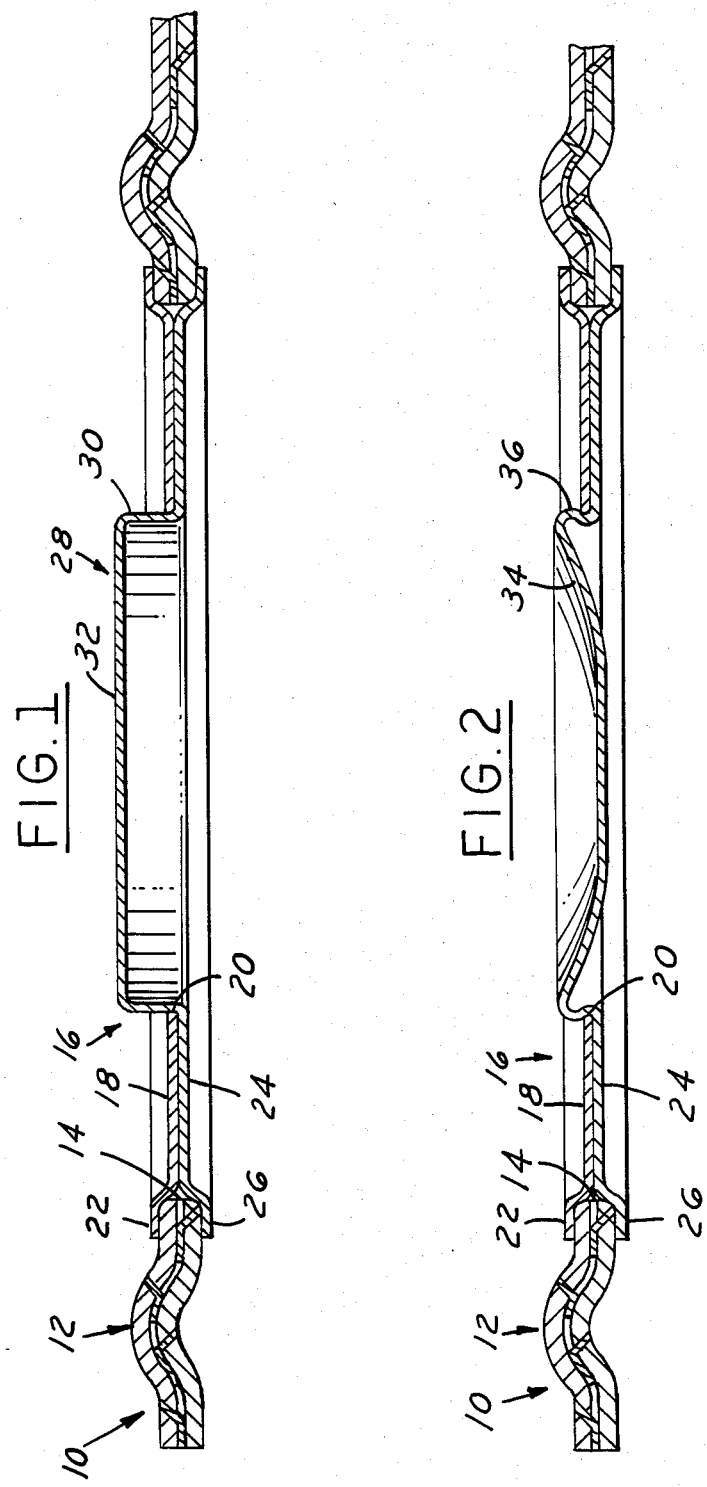

MECHANICAL FASTENER FOR INTAKE MANIFOLD GASKET

TECHNICAL FIELD

This invention relates generally to intake manifold gaskets and, more particularly, to mechanical fasteners for blocking off openings which are formed therein when the gaskets are to be used with fuel injected engines.

BACKGROUND ART

In some intake manifold applications, the gaskets therefor are modified for fuel injected engines by blocking off the gasket opening adjacent the EGR port with a two-piece restrictor which is spot welded in place. Leakage is too often associated with such a spot welded arrangement. Various exhaust gas recirculation valve means are known for at times blocking off the EGR port, e.g., as shown, in Ranft et al U.S. Pat. No. 3,783,848; Goto et al U.S. Pat. No. 3,834,363; Numata et al U.S. Pat. No. 4,036,191; and Tierney U.S. Pat. No. 4,351,303.

DISCLOSURE OF INVENTION

A general object of the invention is to provide improved mechanical fastener means associated with the intake manifold gasket for blocking off the EGR port for fuel injected engine applications.

Another object of the invention is to provide improved mechanical fastener means as an integral part of an intake manifold gasket to block off the EGR port.

A further object of the invention is to provide improved mechanical fastener means for blocking off selected openings of an intake manifold gasket without requiring welding.

Still another object of the invention is to provide mechanical fastener means for mounting in a gasket opening, such fastener means including two mating metal members whose outer edges are oppositely bowed to extend past and confine the oppositely disposed edge portions of the gasket opening therebetween, with one of the members having a central opening formed therein for receiving a "button" extension in the shape of a substantially cylindrical cup formed on the other member and, once extended through the central opening, such button extension being mechanically impacted to be caused to assume a dished shape and a flanged connection with the edge portion of the central opening in the one member.

These and other objects and advantages of the invention will be apparent when reference is made to the following drawings and accompanying description.

BRIEF DESCRIPTION OF THE DRAWINGS

FIG. 1 is a fragmentary cross-sectional view of a first operational step in forming a gasket and mechanical fastener assembly; and FIG. 2 is a fragmentary cross-sectional view of a second and final operational step in forming such a gasket and mechanical fastener assembly.

BEST MODE OF CARRYING OUT THE INVENTION

FIG. 1 illustrates a gasket assembly 10 including an intake manifold gasket 12 having an opening 14 formed therein, and a two-piece mechanical fastener 16 adapted to be fixedly secured in the opening. The mechanical fastener 16 includes a first metal washer-like member 18 having a central opening 20 formed therein and a bowed-out flange 22 formed around the outer peripheral edge portion thereof, adapted to seat on one side of the peripheral edge portion of the opening 14. When seated, the metal member 18 is positioned adjacent a plane through the center of the gasket thickness.

The mechanical fastener 16 further includes a second metal member 24, also having a bowed-out flange 26 formed around its outer peripheral edge portion, adapted to seat on the other side of the peripheral edge portion of the opening 14, such that the member 24 abuts against the other member 18 at the plane through the center of the gasket thickness. A button extension 28, in the shape of a cup having a substantially cylindrical side wall 30 and a flat bottom 32, is formed in the central portion of the member 24 so as to extend through the central opening 20 of the member 18.

As shown in FIG. 2, the side wall 30 and bottom 32, once extended through the opening 20, is reformed in any suitable manner (not shown) so as to assume a dish shape 34 thereacross, with the sides thereof being caused to extend radially outwardly to form an annular flange 36 engaging the edge portion of the opening 20 so as to rigidly connect the first and second metal members 18 and 24 together.

INDUSTRIAL APPLICABILITY

It should be apparent that the invention provides a readily mountable and efficient mechanical means for blocking off an opening in an intake manifold gasket for use with fuel injected engines, without resorting to spot welding.

While but one embodiment of the invention has been shown and described, other modifications thereof are possible within the scope of the following claims.

The embodiments of the invention in which an exclusive property or privilege is claims are defined as follows:

1. A gasket assembly comprising a gasket; an opening formed in the gasket; and a mechanical fastener assembly mounted in the opening; the mechanical fastener assembly including a first metal member having a central opening formed therein and a bowed-out peripheral edge portion mounted on the edge portion of the opening on one side of the gasket, and a second metal member having a bowed-out peripheral edge portion mounted on the edge portion of the opening on the other side of the gasket, and a projection formed in the central portion thereof extending through the central opening of the first metal member and including a peripheral retainer flange around the edge portion of the central opening.

2. The gasket assembly described in claim 1, wherein the opening formed in the gasket and the respective bowed-out peripheral edge portions of the first and second metal members are each rectangular in shape.

3. The gasket assembly described in claim 1, wherein the projection formed in the central portion of the second metal member is dish-shaped within the confines of the retainer flange.

4. The gasket assembly described in claim 1, wherein the projection formed in the central portion of the second metal member includes a substantially cylindrical side wall and flat bottom extended through the central opening prior to being reformed into a dish-shaped retainer flange.

* * * * *